United States Patent
Kojima et al.

(10) Patent No.: US 7,594,635 B2
(45) Date of Patent: Sep. 29, 2009

(54) SEAT SLIDING APPARATUS FOR VEHICLE

(75) Inventors: Yasuhiro Kojima, Kariya (JP); Hideo Nihonmatsu, Anjo (JP); Mikihito Nagura, Okazaki (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 12/054,758

(22) Filed: Mar. 25, 2008

(65) Prior Publication Data

US 2008/0238168 A1 Oct. 2, 2008

(30) Foreign Application Priority Data

Mar. 28, 2007 (JP) .............................. 2007-085331
Sep. 20, 2007 (JP) .............................. 2007-243704

(51) Int. Cl.
    *F16M 13/00* (2006.01)
(52) U.S. Cl. .................................................... 248/429
(58) Field of Classification Search ................ 248/424, 248/429, 430; 296/65.13–65.15; 297/311, 297/344.1
    See application file for complete search history.

(56) References Cited

U.S. PATENT DOCUMENTS 5,813,648 A * 9/1998 Moradell et al. ............ 248/424
7,278,686 B2 * 10/2007 Yoshida ...................... 297/338
2007/0023604 A1 * 2/2007 Chou ........................... 248/424

FOREIGN PATENT DOCUMENTS

| DE | 198 04 506 A1 | 8/1999 |
|----|---|---|
| EP | 1 207 073 A1 | 5/2002 |
| FR | 2 746 721 | 10/1997 |
| JP | 10-151977 | 6/1998 |
| JP | 2002-192994 | 7/2002 |
| JP | 2004-210162 | 7/2004 |
| JP | 2004-359072 | 12/2004 |
| JP | 2005-8065 | 1/2005 |
| JP | 2006-298104 | 11/2006 |

\* cited by examiner

*Primary Examiner*—Ramon O Ramirez
(74) *Attorney, Agent, or Firm*—Oblon, Spivak, McClelland, Maier & Neustadt, L.L.P.

(57) ABSTRACT

A seat sliding apparatus for a vehicle includes a lower rail, an upper rail, a block, and a raised portion. The lower rail is adapted to be fixed to a vehicle floor. The lower rail with a U-shaped cross section has an end and a bottom wall. The upper rail is adapted to be fixed to a seat and supported in the lower rail to be movable relative to the lower rail. The block is fixed to the lower rail and includes an inclined face extending away from the bottom wall of the lower rail as the inclined face approaches the end of the lower rail. The raised portion is formed by cutting the bottom wall of the lower rail and folding the cut wall inward the lower rail to fix the block to the lower rail. Accordingly, a foreign object within the lower rail can be removed without blocking the movement of the upper rail relative to the lower rail.

18 Claims, 5 Drawing Sheets

SEAT SLIDING APPARATUS FOR VEHICLE

CROSS-REFERENCE TO RELATED APPLICATION

This application is based upon and claims the benefit of priority from Japanese Patent Application No. 2007-085331 filed on Mar. 28, 2007 and Japanese Patent Application No. 2007-243704 filed on Sep. 20, 2007, the entire contents of which are incorporated herein by reference.

FIELD OF THE INVENTION

The present invention relates to a seat sliding apparatus for a vehicle.

BACKGROUND

As a seat sliding apparatus for a vehicle, for example, the one disclosed in Japanese Laid-open publication 2005-8065 is known. In this apparatus, a leaf spring is provided at the rear of a lower rail to remove a foreign object which resides within the lower rails. The leaf spring is supported by the lower rail in a manner to be urged upward. When an upper rail is moved rearward, the foreign object is moved and the rear end of the foreign object is lifted on top of the leaf spring. Then, the foreign object is kept moved and projected from the rear end of the lower rail to be removed.

The leaf spring as described above may be inclined downward by the pushing force of the upper rail so that the movement of the upper rail in a rearward direction is not prevented. Accordingly, for example, when the foreign object enters under the leaf spring, the inclination of the leaf spring is restricted and the movement of the upper rail in a rearward direction is prevented. Thus, the upper rail cannot be moved to the rearmost end, which is an original end to which the upper rail should have moved to.

Thus, a need exists for a seat sliding apparatus for a vehicle addressing the problem as mentioned above.

SUMMARY

In a first aspect of the present invention, a seat sliding apparatus for a vehicle includes a lower rail, an upper rail, a block, and a raised portion is provided. The lower rail is adapted to be fixed to a vehicle floor. The lower rail with a U-shaped cross section includes an end and a bottom wall. The upper rail is adapted to be fixed to a seat and supported in the lower rail to be movable relative to the lower rail. The block is fixed to the lower rail and includes an inclined face extending away from the bottom wall of the lower rail as the inclined face approaches the end of the lower rail. The raised portion is formed by cutting the bottom wall of the lower rail and folding the cut wall inward the lower rail to fix the block to the lower rail.

In a second aspect of the present invention, a seat sliding apparatus for a vehicle including a lower rail, an upper rail, a removing member for removing a foreign object, and a stopper is provided. The lower rail is adapted to be fixed to a vehicle floor. The lower rail with a U-shaped cross-section includes an end and a bottom wall. The upper rail is adapted to be fixed to a seat and supported in the lower rail to be movable relative to the lower rail. The removing member is fixed to the lower rail and includes an inclined face extending away from the bottom wall of the lower rail as the inclined face approaches the end of the lower rail to remove the foreign object associated with the movement of the upper rail toward the end of the lower rail. The stopper for limiting the movement of the upper rail relative to the lower rail is located closer to the end of the lower rail than at least a part of the inclined face and operates to fix the removing member to the lower rail.

In a third aspect of the present invention, a seat sliding apparatus for a vehicle including a lower rail, an upper rail, a removing member for removing a foreign object, and a cover member is provided. The lower rail is adapted to be fixed to a vehicle floor. The lower with a U-shaped cross-section includes an end and a bottom wall. The upper rail is adapted to be fixed to a seat and supported in the lower rail to be movable relative to the lower rail and includes a longitudinal end. The removing member is fixed to the lower rail and includes an inclined face extending away from the bottom wall of the lower rail as the inclined face approaches the end of the lower rail to remove the foreign object associated with the movement of the upper rail toward the end of the lower rail. The cover member is provided at the longitudinal end of the upper rail and includes a concave portion for avoiding interference with the removing member when the upper rail moves toward the end of the lower rail.

Other aspects and advantages of the invention will become apparent from the following description, taken in conjunction with the accompanying drawings, illustrating by way of example the principles of the invention.

DESCRIPTION OF EXEMPLARY EMBODIMENTS

In the following, one embodiment of the present invention is described with reference to the drawings.

Figure 1:
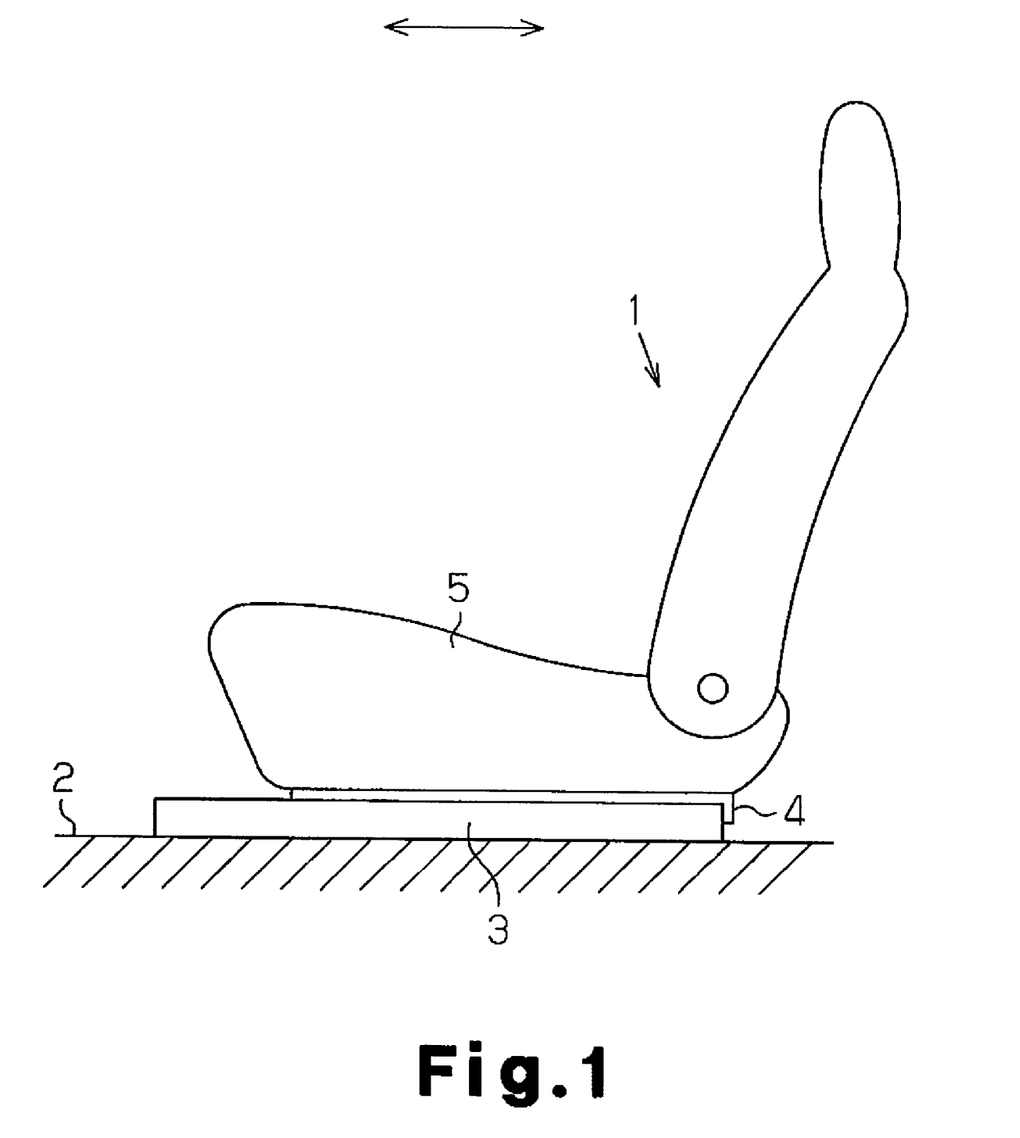
FIG. 1 is a side view of a vehicle seat to which a sliding apparatus of the present invention is applied.

FIG. 1 is a side view schematically illustrating a vehicle seat 1 adapted to be mounted in a vehicle such as an automobile. As illustrated, a lower rail 3 is fixed to a vehicle floor 2 in a manner as to extend in a front and rear direction of the vehicle (a direction indicated by arrow) and an upper rail 4 is attached to the lower rail 3 so that the upper rail 4 can be moved relative to the lower rail 3.

The lower rail 3 and the upper rail 4 are a pair of the lower rails 3 and the upper rails 4 both arranged in a width direction of the vehicle seat 1 (or a direction perpendicular to the paper of FIG. 1), with each lower rail 3 paired with corresponding one of the upper rails 4. The lower rail 3 and the upper rail 4 illustrated in FIG. 1 are the left ones viewed in a forward direction of the vehicle. A seat 5 for forming a seat for a crew member is fixed and supported on the upper rails 4. The movement of the upper rails 4 relative to the lower rails 3 are usually limited by a locking member (not shown) and a manipulation force applied to the locking member releases this limitation.

Figure 2:
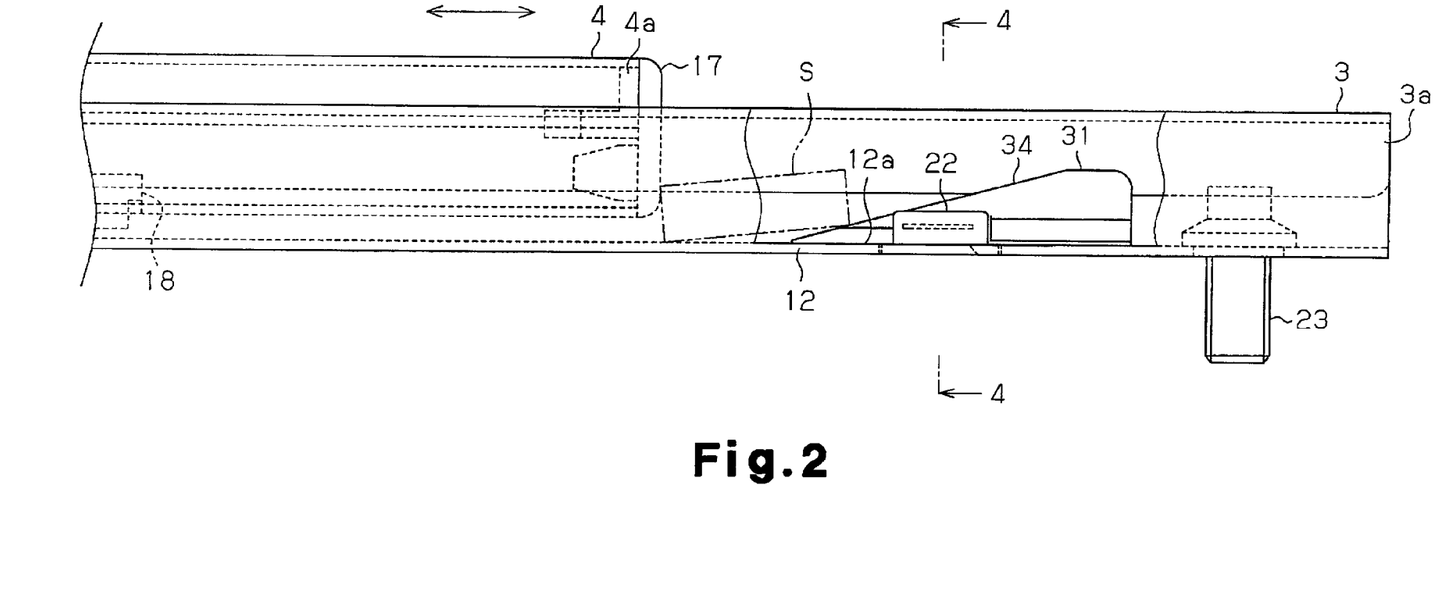
FIG. 2 is a side view of one embodiment of the sliding apparatus of the present invention.
Figure 3:
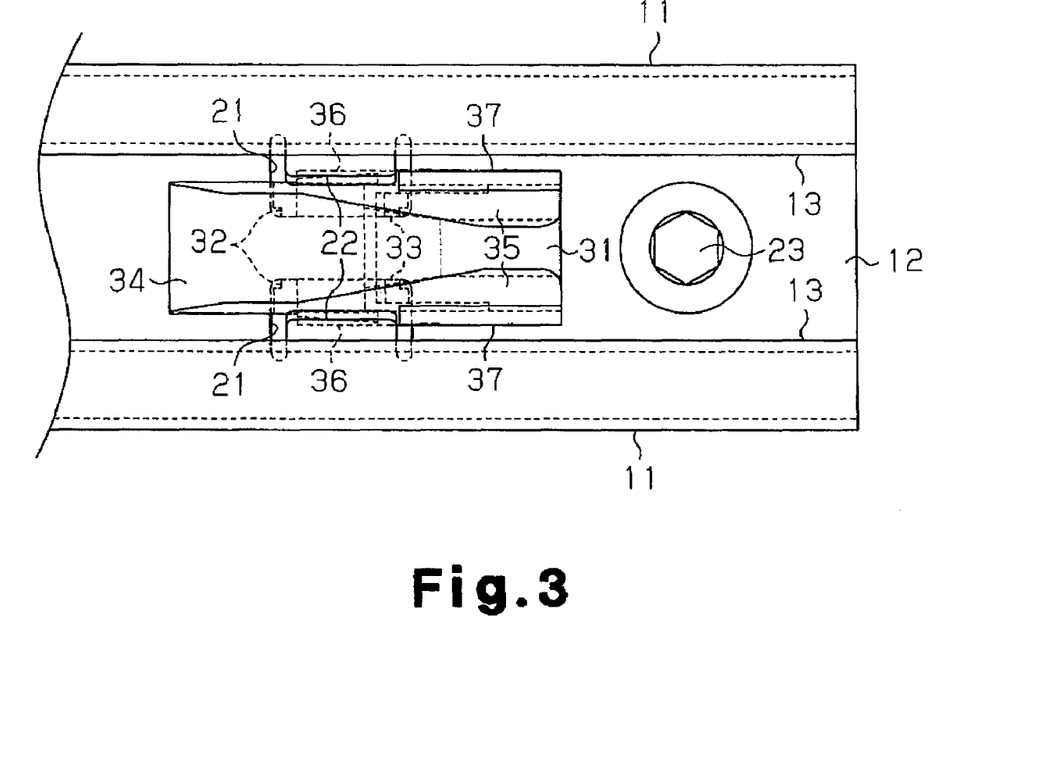
FIG. 3 is a plan view of the sliding apparatus of FIG. 2.
Figure 4:
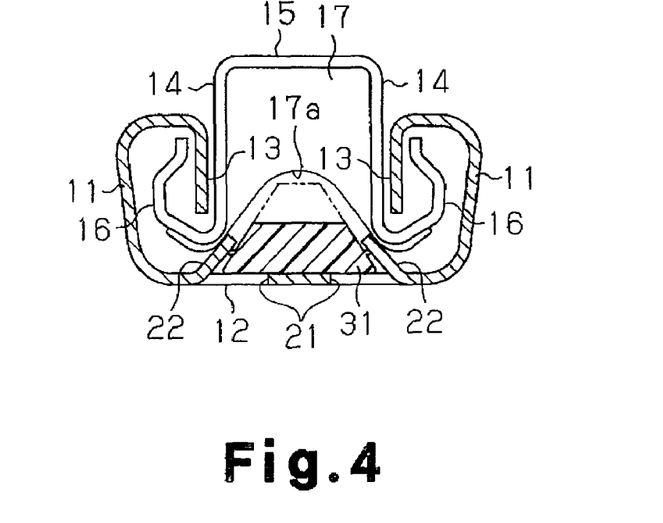
FIG. 4 is a cross-sectional view of FIG. 2 taken along the line 4-4.
Figure 5:
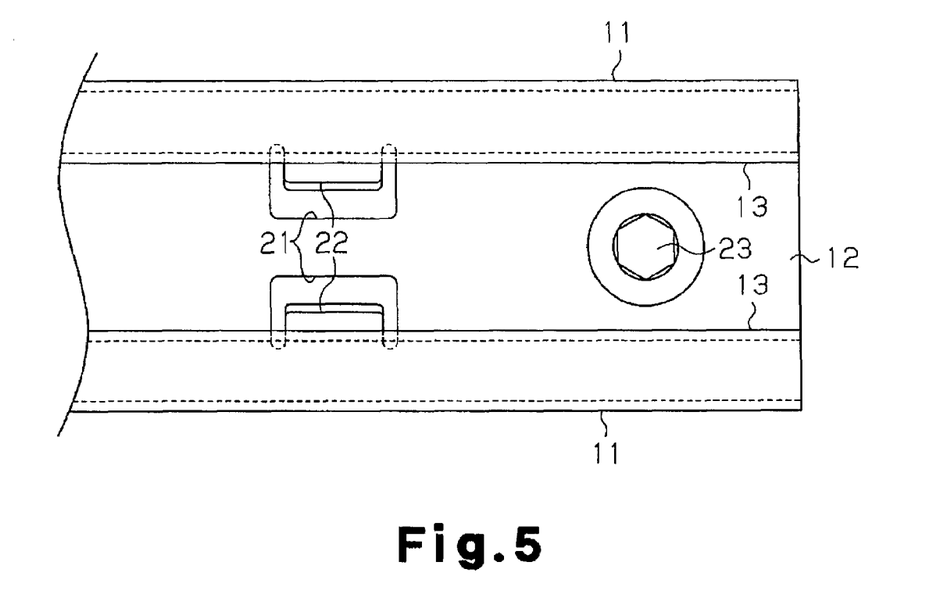
FIG. 5 is a plan view illustrating a lower rail.

Next, a seat sliding apparatus for a vehicle according to an embodiment of the present invention will be explained with reference to FIGS. 2 to 4. FIG. 2 and FIG. 3 are an enlarged side view and an enlarged plan view of a rear end of the seat sliding apparatus, respectively. FIG. 4 is a cross-sectional view of FIG. 2 taken along the line 4-4. Further, FIG. 5 is a plan view illustrating a rear end 3a of the lower rail 3. As mentioned above, a pair of the lower rails 3 and a pair of the upper rails 4 are arranged in a width direction of the vehicle seat 1. Accordingly, a structure including the lower rails 3 and the upper rails 4 is supported in a width direction of the vehicle seat 1. In FIGS. 2 to 5, elements located on the left side, viewed in a forward direction of the vehicle, are mainly illustrated, out of the same elements located in both side of the apparatus.

As illustrated in FIG. 4, the lower rail 3 includes a pair of side walls 11, which stand and are spaced each other in a width direction of the lower rail 3, and a bottom wall 12 for connecting the side walls 11 together. At a distal or an upper end of each side wall 11, a folded wall 13 is continuously formed. Each folded wall 13 is fold inward in a width direction of the lower rail 3 and folded back to the proximal end of the side wall 11.

The upper rail 4 includes a pair of side walls 14, which extend vertically between the folded walls 13 of the lower rail 3, and a lid wall 15 for connecting the side walls 14 together. At a distal or a lower end of each side wall 14, a folded wall 16 is continuously formed. Each folded wall 16 is folded outward in a width direction of the upper rail 4 and folded back to be surrounded by the side wall 11 and the folded wall 13.

That is, the lower rail 3 and the upper rail 4 have U-shaped rail cross-sections the openings of which are met each other so that the lower rail 3 and the upper rail 4 retain each other in a vertical direction mainly by the engagement of the folded walls 13 and 16. An overall rail cross-section formed by the lower rail 3 and upper rail 4 is a box-like shape forming a rectangular configuration.

A roller (not shown) is disposed between each folded wall 16 and the corresponding side wall 11 facing the folded wall 16. The upper rail 4 is supported by the lower rail 3 to be slid in a longitudinal direction of the lower rail 3 (i.e., a forward and rearward direction of the vehicle) in such a manner that the roller is rolled between the lower rail 3 and the upper rail 4. A resin cover member 17 is attached to the rear end 4a of the upper rail 4 to close the opening in the upper rail 4 that opens rearward. A concave portion or a channel 17a is formed in the cover member 17 to extend from the lower side to the upper side of the cover member 17 and serves as a groove-like clearance communicating with rearward of the cover member 17. In addition, a limiting member 18 is provided at the rear portion of the upper rail 4.

As illustrated in a plan view of FIG. 5, a pair of U-shaped cutouts 21 are formed in the bottom wall 12 at the rear end 3a of the lower rail 3 and open to the opposite sides of the lower rail 3 in a width direction thereof. Each raised portion 22 is defined by an inward wall located outer side of each cutout 21 to extend in a width direction of the lower rail 3. A pair of the raised portions 22 are bent at a predetermined angle so as to have a configure where the distance between the raised portions 22 in the width direction becomes shorter as the pair of the raised portions 22 extend upward, i.e., in a direction perpendicular to and away from the bottom face 12a (see FIG. 4).

As illustrated in FIG. 2, the raised portions 22 serve as stoppers for limiting the rearward movement of the upper rail 4 by abutting with the limiting member 18. In this embodiment, further rearward movement is limited when the upper rail 4 reach the rear end 3a of the lower rail 3. The lower rail 3 is secured to the vehicle floor 2 with a bolt 23 that penetrates the bottom wall 12 at a position rearer than (or distal to) the cutouts 21.

Figure 6A:
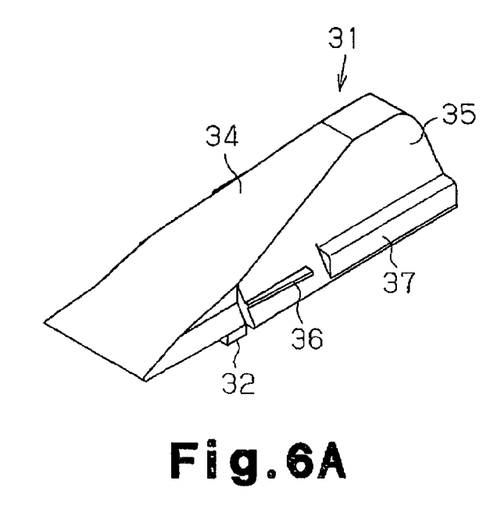
FIG. 6A is a perspective view illustrating a block.
Figure 6B:
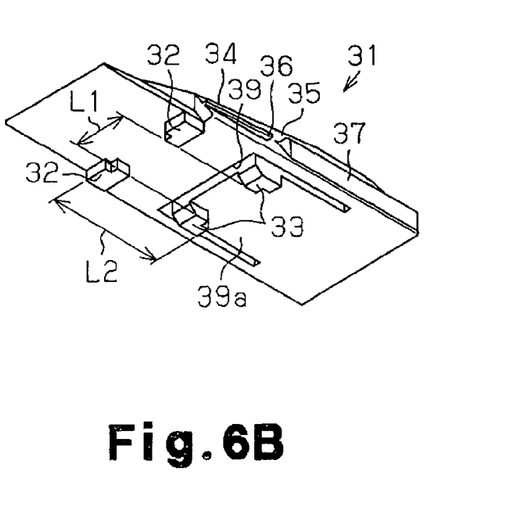
FIG. 6B is a perspective view of the block of FIG. 6-6A viewed from the bottom face thereof.
Figure 7:
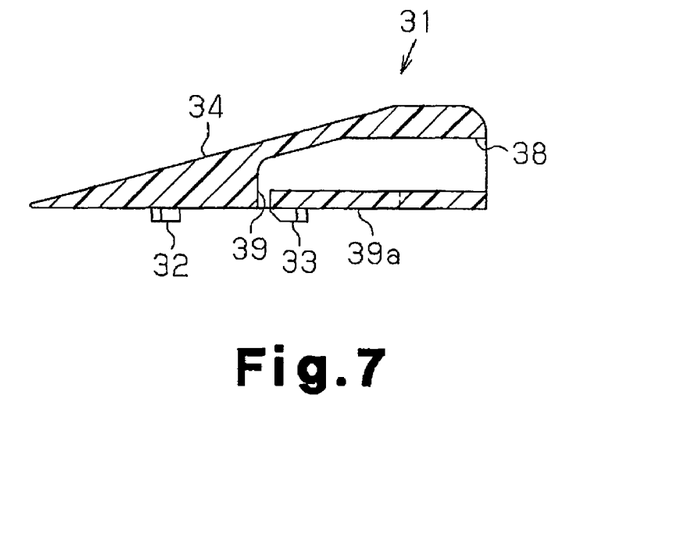
FIG. 7 is a longitudinal sectional view illustrating the block.

A resin block 31 in a slide-like shape is fixed at the rear end 3a of the lower rail 3 and serves as a removing member for removing a foreign object. The block 31 is further explained with reference to FIGS. 6A, 6B and 7. FIGS. 6A and 6B are perspective views of the block 31 and FIG. 7 is a longitudinal sectional view of the block 31. As illustrated, the block 31 includes a pair of fitting portions 32 serving as first fitting portions and a pair of fitting portions 33 serving as second fitting portions. The fitting portions 32 are arranged in a width direction of the block 31 to protrude from the bottom face of the block 31 at the front side thereof. The fitting portions 33 are arranged in a width direction of the block 31 to protrude from the bottom face of the block 31 at the rear side thereof. The distance between the two fitting portions 32 in a width direction of the block 31 and the distance between the two fitting portions 33 in a width direction of the block 31 is substantially the same as L1, which is the distance between the two cutouts 21 in the width direction, or a length of the middle wall between two cutouts 21. Also, the distance between a front face of the fitting portion 32 and a back face of the fitting portion 33 is substantially the same as L2, which is the distance of the cutout 21 in a longitudinal direction of the block 31, or a distance between a wall defining a front end of the cutout 21 and a wall defining a rear end of the cutout 21. The block 31 disposed on the bottom wall 12 is fixedly located both in a longitudinal direction and a width direction of the lower rail 3 by fitting each of the fitting portions 32 and 33 into corresponding one of the cutouts 21 so that the block 31 is fixed to the lower rail 3.

The block 31 includes a planer inclined face 34 that is elevated from the bottom face 12a of the lower rail 3 (bottom wall 12) as it goes toward the rear end 3a of the lower rail 3 (see FIG. 2) and a pair of side walls 35, the distance between which is made shorter as the inclined face 34 is elevated. As illustrated in FIG. 4, a contour of the block 31 projected in a longitudinal direction of the upper rail 4 (i.e., in a forward and rearward direction of the upper rail 4) is formed to conform to the contour of the channel 17a so that the movement of the block 31 does not prevent the movement of the upper rail 4 relative to the lower rail 3.

Each of the two side walls 35 of the block 31 is also inclined along the raised portion 22 so that the block 31 is sandwiched by the pair of the raised portions 22 at the position of the side walls 35. Accordingly, the block 31 is fixedly located both in a width direction and a direction perpendicular to the bottom face 12a at the same time.

Thin flanges 36 are formed on both side walls 35 and protrude outward in width direction of the block 31 at a position between the fitting portions 32 and 33, or at the raised portions 22. When the block 31 is sandwiched by the pair of the raised portion 22 at the side walls 35 and the two thin flanges 36 are compressed by the opposing raised portions 22, the wobble of the block 31 with respect to the lower rail 33 is prevented.

A contour of the block 31 is formed so that the block 31 does not run out of the lower rail 3, in other words, so that the block 31 is housed in the U-shaped cross-section of the lower rail 3. In particular, the protruding length of the fitting portions 32 and 33 is set so that the fitting portions 32 and 33 do not run out of the lower rail 3, in other words, so that the fitting portions 32 and 33 are housed in the lower face of the lower rail 3.

Ribs 37 are also formed in each side wall 35 and protrude outward in width direction of the block 31 at the back of the thin flanges 36. When the block 31 is fit in between the two raised portions 22 from the rear side of the lower rail 3 and the fitting portions 32, 33 are fit into the cutouts 21, each rib 37 abuts the raised portion 22 to locate the block 31 in a forward and rearward direction of the lower rail 3.

As illustrated in FIG. 7, a bore 38 is formed in the block 31 and extends from the rear end of the block 31 to frontward. The bore 38 opens downward at a hole 39 formed in the bottom wall of the block 31. As illustrated in FIG. 6B, the hole 39 is U-shaped so that the fitting portions 33 are cantilevered at the rear end thereof. In other words, a planar support piece 39a is defined by the hole 39 in the bottom wall of the block 31 and cantilevered at the rear end thereof, and the fitting portions 33 are disposed on a distal end of the support piece 39a.

Figure 8A:
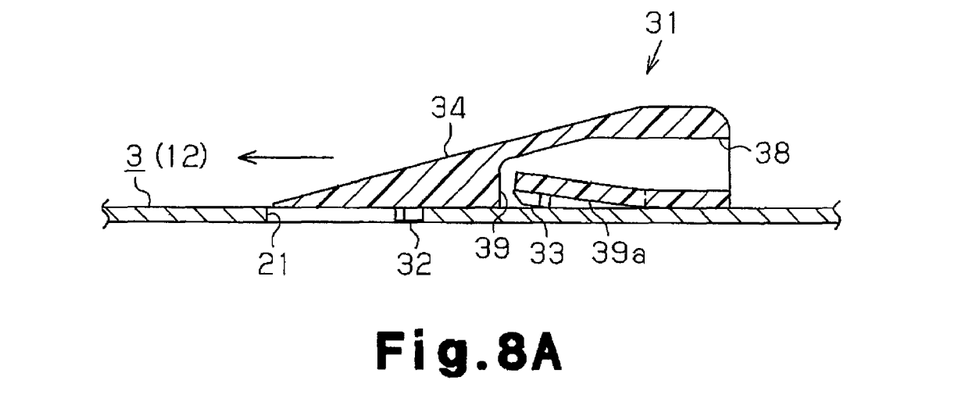
FIG. 8A is a longitudinal sectional view illustrating an attachment of the block.
Figure 8B:
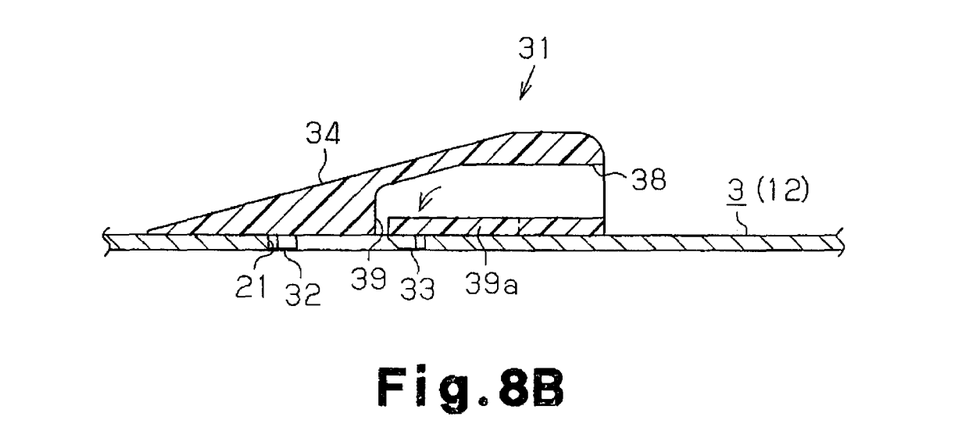
FIG. 8B is a longitudinal sectional view illustrating an attachment of the block.

Now, to sandwich the block 31 by a pair of the raised portions 22, the block 31 is assembled in a longitudinal direction of the lower rail 3. As illustrated in FIGS. 8A and B, the front fitting portions 32, the fitting portions nearer to the raised portions 22, are fit into the cutout 21 while the rear fitting portions 33, the fitting portions more distant from the raised portions 22, are pressed against the bottom face 12a of the lower rail 3 to be retracted (pushed upward) by elastic deformation. Thus, the rear of the block 31 are not lifted up from the bottom face 12a of the lower rail 3 by the height of the fitting portions 33 and the assembly of the block 31 is not prevented. In this situation, when the block 31 is slidably advanced, the fitting portions 33 reach the cutouts 21 and fit into the cutouts 21 by the restoration force generated around the proximal end of the cantilever or the support piece 39a. The, the fitting portions 32 and the fitting portions 33 fit in the cutouts 21 at the front end and the rear end thereof, respectively.

In this way, the fitting portions 32 are engaged with the wall of the lower rail 3 defining the front end of the cutouts 21 and the fitting portions 33 are engaged with the wall of the lower rail 3 defining the rear end of the cutouts 21 so that the block 31 is fixedly located in a longitudinal direction of the lower rail 3. In addition, each inward side face of the fitting portions 32, 33 in a width direction thereof is engaged with a wall defining the inward side end of each cutout 21 in a width direction thereof so that the block 31 is fixedly located in a width direction of the lower rail 3.

In that case, the block 31 is fixedly located in a width direction of the lower rail 3 also by the pair of the raised portions 22 that sandwich the block 31. Accordingly, the block 31 is located in a width direction of the lower rail 3 in cooperation of the pair of the raised portions 22 with the fitting portions 32, 33. At the same time, the block 31 is also located in a direction perpendicular to the bottom face of the lower rail by the pair of the raised portions 22 that sandwich the block 31. The block 31 is fixedly located in combination with a pair of the raised portion 22. In other words, the block 31 is extremely difficult to remove since, to remove the block 31, the fitting of the fitting portions 33 with the cutouts 21 has to be released by moving the fitting portions 33 in a direction perpendicular to the bottom surface of the lower rail 3 and sandwiched state of the block 31 by a pair of the raised portions 22 has to be released by sliding the block 31 in a longitudinal direction of the lower rail 3.

In this configuration, when the upper rail 4 is moved rearward along the lower rail 3, the upper rail 4 does not interfere with the block 31 as described above and moves to the rearmost end where the limiting member 18 abuts the raised portions 22.

Meanwhile, as also illustrated in FIG. 2, a foreign object S such as a lighter or a small article dropped in the lower rail 3 (or within the cross-section of the lower rail 3) in front of the block 31 (or at the front side of the lower rail 3) is pushed and moved by the upper rail 4 (the cover member 17) that moves rearward in such a manner that the foreign object S is guided onto the inclined face 34 of the block 31. Thus, the foreign object S can be removed beyond the block 31 to the end of the lower rail 3, finally to outside the lower rail 3.

The present embodiments as described above have the following advantages.

(1) The foreign object S that entered the lower rail 3 in front of the block 31 (or on the front end side of the lower rail 3) is pushed and moved associated with the movement of the upper rail 4 in a manner as to be guided onto and gradually lifted on the inclined face 34. Thus, the foreign object S can be removed beyond the block 31 to the rear end 3a of the lower rail 3 and finally to outside the lower rail 3. In addition, the block 31 does not need to elastically deform so as to allow the movement of the upper rail 4 toward the rear end 3a of the lower rail 3. Accordingly, the movement of the upper rail 4 toward the rear end 3a of the lower rail 3 is not prevented by the foreign object S residing near the block 31 e.g., so long as the upper rail 4 does not interfere with the block 31 itself.

(2) A portion of the block 31 is located closer to the front end of the lower rail 3 than the raised portions 22 serving as stoppers. Accordingly, the foreign object S, which is moved by the upper rail 4 that moves toward the rear end 3a of the lower rail 3, may be removed by the block 31 at the front side of the lower rail 3 with respect to the raised portions, or at the location before the movement of the foreign object S is prevented by interference with the raised portions 22.

(3) The foreign object S that resides in the lower rail 3 is guided onto the inclined face 34 of the block 31 and removed in a state where the foreign object S is lifted above the raised portions 22. Thus, the foreign object S can be removed by the block 31 while preventing interference with the raised portions 22. In this case, since the clearance or channel 17a is provided in the upper rail 4 (the cover member 17), the movement of the upper rail 4 toward the rear end 3a of the lower rail 3 is not prevented by the inclined face 34.

(4) The block 31 can be fixed to the lower rail 3 easily by fitting the fitting portions 32, 33 into the cutouts 21 provided for forming the raised portions 22. For example, the block 31 may be fixed by a simple operation without using welding or caulking.

(5) The block 31 is sandwiched by the raised portions 22 at the side walls 35 having the thin flanges 36. Thus, displacement of the lower rail 3 in a width direction can be prevented. In particular, the distance between the pair of the raised portions 22 in a width direction becomes shorter as the pair of the raised portions 22 extend vertically, or in a direction perpendicular to and away from the bottom face 12a of the lower rail 3. The block 31 is sandwiched by the pair of the raised portions 22 at the side walls 35 which are inclined along the corresponding raised portions 22. Accordingly, the block 31 may be fixedly located both in a width direction of the lower rail 3a and a direction perpendicular to the bottom face 12a at the same time.

(6) The block 31 is located both in a longitudinal direction and a width direction of the lower rail 3 by fitting the fitting portions 32, 33 into the cutouts 21. Accordingly, in addition to the pair of the raised portions 22 for locating the block 31 in a width direction of the lower rail 3a and in a direction perpendicular to the bottom face at the same time, the block 31 can be fixed more firmly.

(7) The block 31 can be fixed by making use of the raised portions 22 (stoppers). In other words, an additional separate element required for removing the foreign object S is the block 31 only. Accordingly, the increase in the number of the parts is prevented, thereby the costs are reduced.

(8) In a state where the block 31 is fixed to the lower rail 3, the block 31 does not run out of the lower rail 3. That is, the block 31 is configured to be housed in the U-shaped cross section of the lower rail 3. Accordingly, even if an object such as a peripheral part inadvertently contacts the lower rail 3 during assembly or mounting to the vehicle, interference of the peripheral part with the block 31 is avoided, thereby the detachment of the block 31 from the lower rail 3 is prevented.

(9) The protruding length of the fitting portions 32, 33 is set so that the fitting portions 32, 33 do not run out of the lower rail 3 in a state where the fitting portions 32, 33 are fitted in the cutouts 21. Accordingly, even if an object such as a peripheral part inadvertently contacts the lower rail 3 during assembly or mounting to the vehicle, interference of the peripheral part with the fitting portions 32, 33 is avoided, thereby the detachment of the block 31 from the lower rail 3 is prevented.

(10) The thin flanges 36 prevent wobble of the block 31 relative to the lower rail 3. Accordingly, the block 31 is fixedly located in the lower rail 3.

The above embodiment may be modified as follows.

The raised portions 22, which serve as stoppers, may be omitted and the bolt 23 may serve as a stopper instead. In this case, it is preferred that the block 31 is located closer to the front end of the lower rail 3 than the bolt 23.

The front and the rear of the block 31 may reversed so that the block 31 is fixed to the front end of the lower rail 3. In this regard, the foreign object S residing in the lower rail 3 is pushed and moved associated with the movement of the upper rail 4 toward the front end of the lower rail 3, thereby the foreign object S is removed at the side of the front end of the lower rail 3, even outside the lower rail 3.

The cross-section of the lower rail 3 and the upper rail 4 is not limited to a box-like shape. For example, the cross-section of the upper rail 4 may be an inverted T shape.

The number of the lower rail 3 and the upper rail 4 may be one or not less than 3 for one seat 5.

The moving direction of the seat associated with the movement of the upper rail relative to the lower rail may be, for example, a width direction of the vehicle.

The support piece 39a may not be necessarily cantilevered at the rear of the block 31 (on the opposite side of the fitting portion 33). For example, support piece 39a may be cantilevered in a width direction of the block 31.

The thin flange 38 may be omitted.

The block 31 may not necessarily be sandwiched by the raised portions 22 serving as stoppers. Dedicated raised portions for sandwiching the block 31 may be formed in the lower rail 3 to sandwich the block 31 between the raised portions.

What is claimed is:

1. A seat sliding apparatus for a vehicle comprising:
   a lower rail adapted to be fixed to a vehicle floor, wherein the lower rail with a U-shaped cross-section includes an end and a bottom wall;
   an upper rail adapted to be fixed to a seat and supported in the lower rail to be movable relative to the lower rail;
   a block fixed to the lower rail, wherein the block includes an inclined face extending away from the bottom wall of the lower rail as the inclined face approaches the end of the lower rail; and
   a raised portion formed by cutting the bottom wall of the lower rail and folding the cut wall inward the lower rail to fix the block to the lower rail.

2. The seat sliding apparatus of claim 1, wherein the raised portion serves as a stopper for limiting the movement of the upper rail relative to the lower rail, and the raised portion is located closer to the end of the lower rail than at least a part of the inclined face.

3. The seat sliding apparatus of claim 2, wherein the inclined face extends longer than the raised portion in a direction perpendicular to the bottom wall of the lower rail, and a clearance for avoiding interference with the block is provided in the upper rail.

4. The seat sliding apparatus of claim 1, wherein the upper rail includes a longitudinal end, and a cover member is provided in the longitudinal end and includes a concave portion for avoiding interference with the block when the upper rail moves toward the end of the lower rail.

5. The seat sliding apparatus of claim 1, wherein a cutout for forming the raised portion is provided in the bottom wall of the lower rail, and a fitting portion for fitting in the cutout protrudes from the block.

6. The seat sliding apparatus of claim 5, wherein a protruding length of the fitting portion is set so that the fitting portion does not run out of the lower rail in a state where the fitting portion is fitted in the cutout.

7. The seat sliding apparatus of claim 1, wherein the raised portion is a pair of the raised portions arranged in a width direction of the lower rail, and the block is sandwiched between the pair of the raised portions.

8. The seat sliding apparatus of claim 7, wherein the pair of the raised portions are shaped so that the distance between the pair of the raised portions in the width direction becomes shorter as the raised portions extend in a direction perpendicular to and away from a bottom face of the lower rail, the block includes side walls each inclined along corresponding one of the raised portions, and the block is sandwiched between the raised portions at the side walls.

9. The seat sliding apparatus of claim 8, wherein a thin flange is provided on each of the side walls, and the thin flange is adapted to be compressed by the raised portion to prevent wobble of the block relative to the lower rail.

10. The seat sliding apparatus of claim 8, wherein a cutout for forming the raised portion is provided in the bottom wall of the lower rail, and a fitting portion for fitting in the cutout protrudes from the block,
    wherein the cutout includes a first side end and second side end arranged in a longitudinal direction of the lower rail, the fitting portion includes a first fitting portion and a second fitting portion fitting in the cutout at the first side end and the second side end, respectively, and the first fitting portion is located closer to the raised portion than the second fitting portion,
    wherein the second fitting portion is provided in a support piece to protrude therefrom, and the support piece is cantilevered by the block so as to elastically deform in a direction perpendicular to the bottom face of the lower rail,
    wherein, when the block is sandwiched by the raised portions, the first fitting portion is fit into the cutout and the second fitting portion is pressed against a bottom face of the lower rail to elastically deform the support piece so that the second fitting portion is urged in a direction perpendicular to the bottom face, the block is slid in the longitudinal direction of the lower rail, and the urged second fitting portion is caused to fit into the cutout by restoration of the support piece, thereby the block is fixed to the lower rail.

11. The seat sliding apparatus of claim 1, wherein a stopper for limiting the movement of the upper rail relative to the lower rail is provided in the lower rail, and the stopper is located closer to the end of the lower rail than at least a part of the inclined face.

12. The seat sliding apparatus of claim 11, wherein the raised portion includes the stopper.

13. The seat sliding apparatus of claim 1, wherein a contour of the block is formed so that the block does not run out of the lower rail in a state where the block is fixed to the lower rail.

14. The seat sliding apparatus of claim 1, wherein the block removes a foreign object in the lower rail associated with the movement of the upper rail toward the end of the lower rail.

15. A seat sliding apparatus for a vehicle comprising:
a lower rail adapted to be fixed to a vehicle floor, wherein the lower rail with a U-shaped cross-section includes an end and a bottom wall;
an upper rail adapted to be fixed to a seat and supported in the lower rail to be movable relative to the lower rail;
a removing member for removing a foreign object, wherein the removing member is fixed to the lower rail and includes an inclined face extending away from the bottom wall of the lower rail as the inclined face approaches the end of the lower rail to remove the foreign object associated with the movement of the upper rail toward the end of the lower rail; and
a stopper for limiting the movement of the upper rail relative to the lower rail, wherein the stopper is located closer to the end of the lower rail than at least a part of the inclined face and operates to fix the removing member to the lower rail.

16. The seat sliding apparatus of claim 15, wherein the lower rail includes a bottom wall, and the stopper includes a raised portion formed by cutting the bottom wall of the lower rail and folding the cut wall inward the lower rail to fix the block to the lower rail.

17. A seat sliding apparatus for a vehicle comprising:
a lower rail adapted to be fixed to a vehicle floor, wherein the lower rail with a U-shaped cross-section includes an end and a bottom wall;
an upper rail adapted to be fixed to a seat and supported in the lower rail to be movable relative to the lower rail, wherein the upper rail includes a longitudinal end;
a removing member for removing a foreign object, wherein the removing member is fixed to the lower rail and includes an inclined face extending away from the bottom wall of the lower rail as the inclined face approaches the end of the lower rail to remove the foreign object associated with the movement of the upper rail toward the end of the lower rail; and
a cover member provided at the longitudinal end of the upper rail, wherein the cover member includes a concave portion for avoiding interference with the removing member when the upper rail moves toward the end of the lower rail.

18. The seat sliding apparatus of claim 17, wherein the lower rail includes a bottom wall, and the removing member includes a raised portion formed by cutting the bottom wall of the lower rail and folding the cut wall inward the lower rail to fix the removing member to the lower rail.

* * * * *